(12) United States Patent
Negulescu

(10) Patent No.: US 8,438,829 B2
(45) Date of Patent: May 14, 2013

(54) TURBOPROP PROPULSION UNIT WITH PUSHER PROPELLER

(75) Inventor: Dimitrie Negulescu, Berlin (DE)

(73) Assignee: Rolls-Royce Deutschland Ltd & Co KG (DE)

(*) Notice: Subject to any disclaimer, the term of this patent is extended or adjusted under 35 U.S.C. 154(b) by 751 days.

(21) Appl. No.: 12/711,872

(22) Filed: Feb. 24, 2010

(65) Prior Publication Data

US 2010/0212285 A1    Aug. 26, 2010

(30) Foreign Application Priority Data

Feb. 25, 2009    (DE) .......................... 10 2009 010 524

(51) Int. Cl.
*B64C 11/48* (2006.01)
*F02C 3/14* (2006.01)

(52) U.S. Cl.
USPC .............. 60/39.183; 60/262; 60/783; 60/801; 60/226.1; 416/124; 416/128; 416/129; 416/120; 244/69; 244/71

(58) Field of Classification Search ................ 60/226.1, 60/262, 39.183, 783, 801, 802; 416/123, 416/124, 128, 129, 120; 244/62, 69, 71
See application file for complete search history.

(56) References Cited

U.S. PATENT DOCUMENTS

| 2,272,626 A | 2/1942 | Starke |
| 2,454,738 A * | 11/1948 | Hawthorne ...................... 60/269 |
| 2,504,414 A * | 4/1950 | Hawthorne ................... 60/39.17 |
| 2,704,434 A * | 3/1955 | Schmitt ............................ 60/761 |
| 3,131,536 A * | 5/1964 | Snell ............................. 60/226.1 |
| 4,688,995 A | 8/1987 | Wright |
| 5,105,618 A * | 4/1992 | Lardellier ................... 60/226.1 |
| 2007/0056291 A1 | 3/2007 | Koenig |
| 2008/0258005 A1 | 10/2008 | Gall et al. |

FOREIGN PATENT DOCUMENTS

| DE | 3611792 | 11/1986 |
| DE | 102005043615 | 3/2007 |

OTHER PUBLICATIONS

German Search Report dated Jul. 20, 2009 from counterpart patent application.

* cited by examiner

*Primary Examiner* — Phutthiwat Wongwian
*Assistant Examiner* — Steven Sutherland
(74) *Attorney, Agent, or Firm* — Timothy J. Klima; Shuttleworth & Ingersoll, PLC

(57) ABSTRACT

A turboprop propulsion unit includes at least one pusher propeller 5, 6 driven by an aircraft gas-turbine engine, with the aircraft gas-turbine engine being arranged in front of the pusher propeller 5, 6 in a direction of flight. A turbine outlet area 9 is arranged at the front in the direction of flight and a compressor area 14 faces towards the pusher propeller 5, 6.

20 Claims, 3 Drawing Sheets

TURBOPROP PROPULSION UNIT WITH PUSHER PROPELLER

Figure 1:
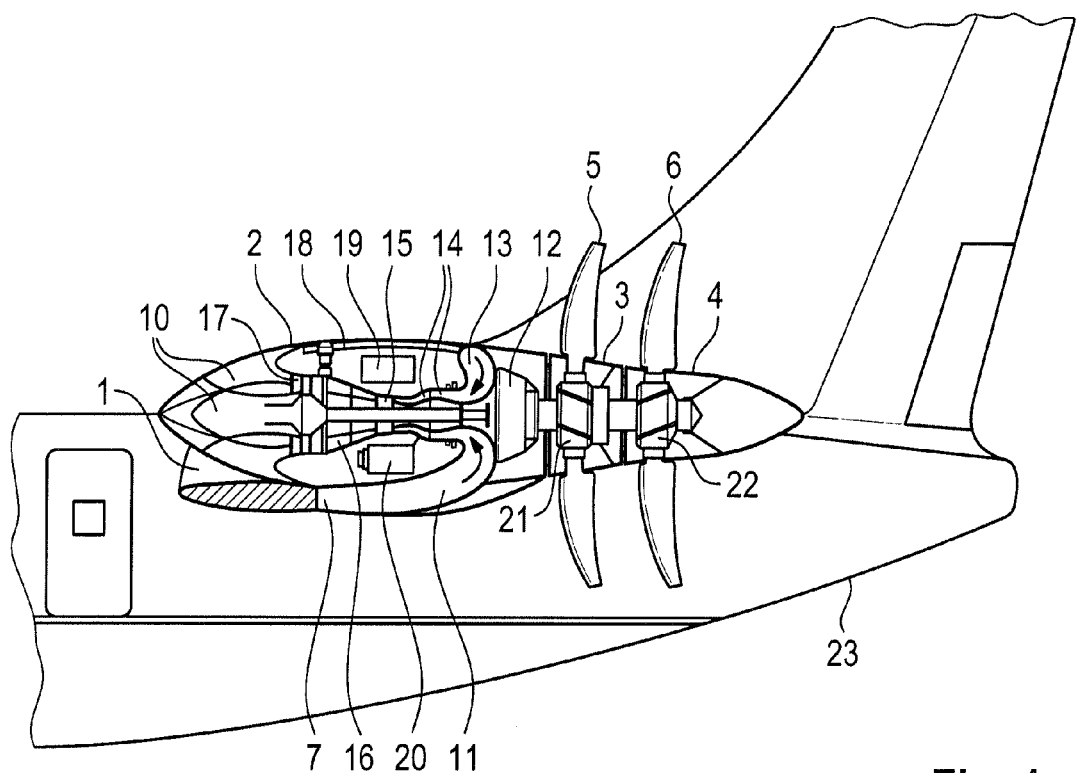

This application claims priority to German Patent Application DE102009010524.7 filed Feb. 25, 2009, the entirety of which is incorporated by reference herein.

This invention relates to a turboprop propulsion unit with at least one pusher propeller driven by an aircraft gas-turbine engine.

From the state of the art it is known to employ aircraft gas-turbine engines for a turboprop propulsion unit and to make use of pusher propellers. As viewed in the direction of flight, the aircraft gas-turbine engine is accordingly arranged in front of the one pusher propeller or the several pusher propellers. More particularly, this type of propulsion unit is known with aircraft tail installations.

On the known turboprop propulsion units, the aircraft gas-turbine engine is arranged in the usual direction of flow. This means that the aircraft gas-turbine engine is flown from the front (relative to the aircraft longitudinal axis), so that in the usual arrangement the inflowing air passes through a compressor before it reaches the combustion chamber and the exhaust gases are supplied to a turbine. Here, a direct pitot inlet to the compressor is arranged on the forward part of the nacelle. Arranged in downstream direction is accordingly the turbine which transmits power to the pusher propeller, or propellers, via a turbine shaft. Power is here transmitted either to a propeller reduction gear or directly to the propeller. Situated in further downstream direction on the known arrangement is the nozzle through which the exhaust gases are discharged.

The design according to the state of the art is characterized by the following disadvantages:

Since the propeller drive is located in the immediate vicinity of the exit of the hot exhaust gases, the propellers operate within the hot exhaust gases of the turbomachine. This substantially reduces the life of the propellers. Furthermore, an increase in noise emission is incurred.

A further, major disadvantage lies in the fact that the hot exhaust gases flow around the propeller gear, requiring considerable effort to cool both the suspension structure and the control mechanism, as well as the gear itself. This is usually accomplished with large oil-air coolers which are cost-intensive and contribute to additional weight.

Another disadvantage incurred with these arrangements is the failure susceptibility of the installation with short running time between major overhauls. Overall reliability of the propulsion system is inadequate. Furthermore, the risk of fire in the event of oil leakage from the gear and the propeller blade pitch control mechanism incurs an increased danger potential.

For the state of the art, reference is made to US 2008/258005 A.

A broad aspect of this invention is to provide a turboprop propulsion unit of the type specified at the beginning above which, while being simply designed and easily and cost-effectively producible, avoids the disadvantages of the state of the art and is characterized by a high degree of reliability.

According to the present invention, a turboprop propulsion unit is therefore provided on which the aircraft gas-turbine engine is installed in reverse direction in relation to the external airflow direction. Accordingly, the aircraft gas-turbine engine is installed such that the main axial gas flow through the gas-turbine engine if from aft forward, such that hot exhaust gases, in relation to the direction of flight, exit at the front, while the cooler compressor area is situated aft of the turbine and adjacent to the pusher propellers.

In a favorable development of the present invention, it is provided that the turbine shaft is extended towards the pusher propeller and is connected to a gear driving the pusher propeller. This means that the gear is not situated in the area of the hot exhaust gases, enabling costly cooling devices to be either fully dispensed with or to be dimensioned smaller.

The reduced thermal loading of both the propellers and the gear, as well as the control mechanisms, provides for an increased level of reliability and a longer running time between major overhauls.

The arrangement according to the present invention also provides for a reduction in noise emission because the exhaust gas exiting from the nozzle is not directly introduced to the propeller and does not flow off through a rearward nozzle.

The possibility making the suspension structure smaller and hence, more lightweight, is a further advantage.

According to the present invention, it is particularly favorable if at least one inlet flow duct diverting the inflowing air to the compressor and issuing in the inflow area of the compressor is provided. Thereby, the air supplied from the front of the engine (with respect to the direction of flight) is diverted by 180° and fed to the compressor of the aircraft gas-turbine engine from the rear in relation to the direction of flight.

It is also particularly favorable here if an exhaust gas flow duct diverting the exhaust gas flow in the direction of the thrust propeller is provided. Thereby, the exhaust gases flowing toward the front of the engine (with respect to the direction of flight) are also diverted by 180° and specifically routed toward the rear into the propeller area. As a result of the constructional length of the turboprop propulsion unit, the hot gas flow will considerably cool down between exiting the turbine and reaching the propeller area and thus, will reach the propeller area at a temperature of, for example, only 100° C. after having left the turbine and entering the exhaust gas flow duct at a considerably higher temperature upon. In a favorable embodiment, the exhaust gas flow duct can issue in the forward area of the turboprop propulsion unit, thereby ensuring unobstructed flow guidance of both the exhaust gases and the fresh air supplied to the compressor. Here, it is particularly favorable if the inlet flow duct and the exhaust gas flow duct are arranged offset to one another in the circumferential direction of the turboprop propulsion unit.

According to the present invention, provision can also be made for two counter-rotating pusher propellers.

The present invention is not limited to tail installations of counter-rotating propellers, but also relates to tail installations with only one propeller or to a propfan installation.

Figure 2:
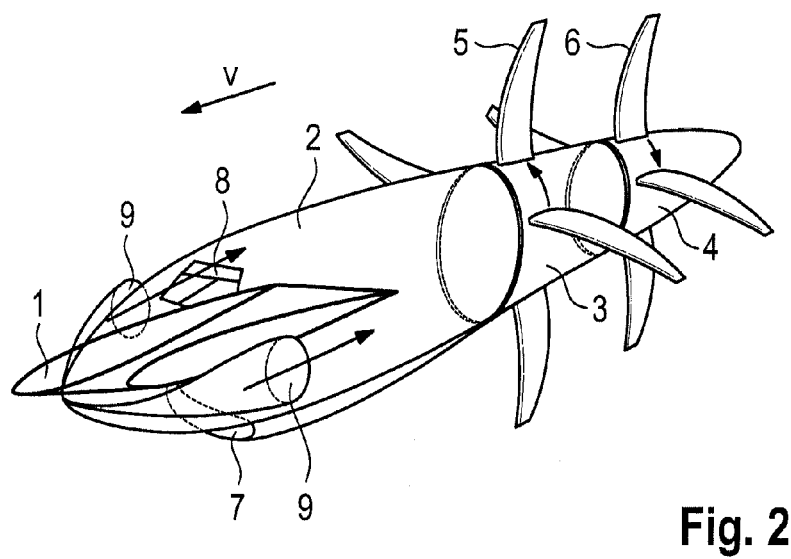
Figure 3:
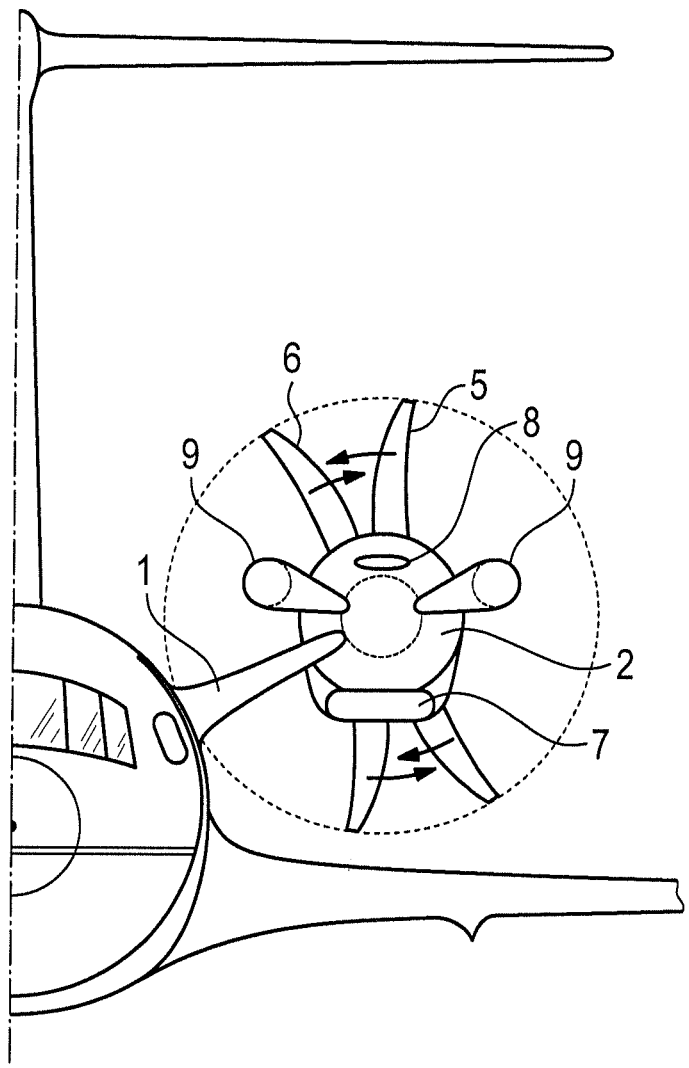
Figure 4:
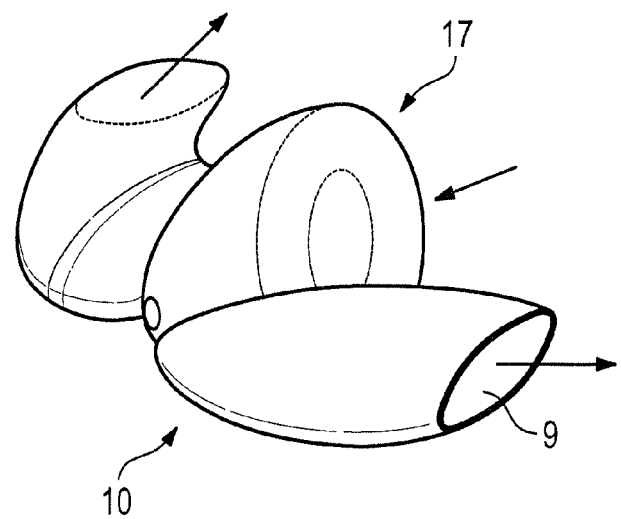
Figure 5:
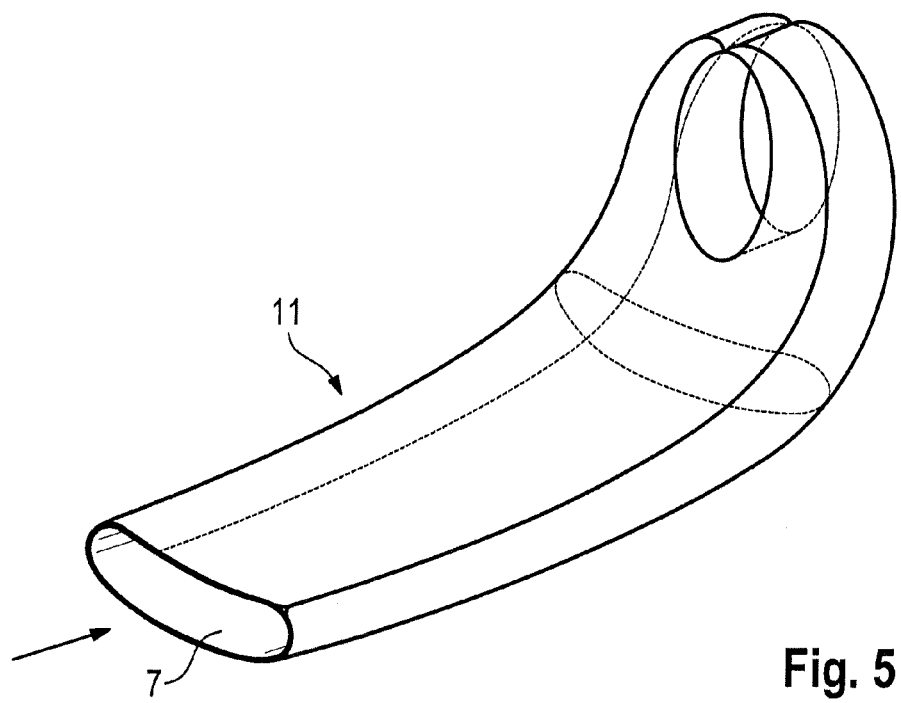

In the following, the present invention is more fully described in light of the accompanying drawings showing a preferred embodiment. In the drawings, FIG. 1 is a partial side view, partly cutaway, of a tail installation of an inventive turboprop propulsion unit on an aircraft, FIG. 2 is a perspective simplified partial view, FIG. 3 is a frontal view, analogically to FIG. 1, FIG. 4 is a perspective schematic representation of an embodiment of a reverser exhaust gas casing, and FIG. 5 is a perspective simplified representation of an embodiment of an inlet duct in accordance with the present invention.

FIG. 1 shows the rearward area (tail) of the fuselage 23 of an aircraft. As shown in FIG. 3, the engine nacelle 2 is mounted to the fuselage 23 by pylon 1. The engine nacelle 2, in the usual manner, encloses a turbomachine including an aircraft gas-turbine engine.

Provided on the engine nacelle, aft of the gas-turbine engine, are two pusher propellers, actually a front propeller 5 and a rear propeller 6. FIG. 1 shows a fairing 3 of the front propeller hub and a fairing 4 of the rear propeller hub. The pusher propellers 5 and 6, which include a front propeller hub 21 and a rear propeller hub 22, are state of the art, so that a detailed description can here be dispensed with.

The two pusher propellers 5, 6 are driven by a turbine shaft via a propeller reduction gear 12 arranged upstream of the pusher propellers 5, 6 in the direction of flow.

According to the present invention, the aircraft gas-turbine engine is installed such that a compressor intake casing 13 is, in the direction of flight, arranged before the propeller reduction gear 12. Air flows from an engine intake 7 via an inlet duct 11 (inlet flow duct) into the compressor intake casing 13. As illustrated in FIG. 1, the inflowing air is diverted by essentially 180° before it enters a compressor 14 from the rear.

The air flows, in opposite direction of flight, from the compressor 14 into a combustion chamber 15 and then into a turbine 16 of a gas generator. A power turbine 17 is subsequently passed by the gas flow. The exhaust gas then flows into a reverser exhaust gas casing 10 (exhaust gas flow duct) in which the exhaust gases are diverted by approx. 180° to enable them to be discharged to the rear from nozzles 9 towards the propellers 5, 6. Nozzles 9 are faired with the reverser exhaust gas casing 10.

Accordingly, the inflowing air initially reaches the rear area adjacent to the propellers 5, 6, then passes through the aircraft gas-turbine engine from aft (rear) to the front, opposite to the direction of propulsion/flight, and is then is diverted again to the rear at the exhaust gas exit.

FIG. 1 further shows a linkage 18 of the engine suspension structure as well as an air-oil cooler 19 with an inlet 8 shown in FIG. 3. Reference numeral 20 designates a turbomachine accessory drive casing.

FIG. 3 is a frontal view illustrating the direction of rotation of the counter-rotating propeller blades. It is further shown in FIG. 3 that the inlet 8 to the oil cooler, the engine intake 7 and the nozzles 9 are circumferentially offset so that the flow is not disturbed.

FIG. 2 shows in schematic, perspective representation the suspension structure of the engine nacelle 2 via pylon 1 and the intakes/inlets 7, 8 and nozzles 9 already described with reference to FIG. 3.

FIGS. 4 and 5 show in perspective, simplified representations, a reverser exhaust gas casing/exhaust gas flow duct 10 (FIG. 4) and an inlet duct/inlet flow duct 11 (FIG. 5).

FIG. 4 here shows the inflow from the power turbine 17 into the reverser exhaust gas casing 10 and the diversion and distribution of the exhaust gas to supply the latter to two (or another number) sideward nozzles 9. The inlet of the reverser exhaust gas casing 10 is annular. Through optimization of flow, residual thrust is generated by the nozzles 9.

FIG. 5 shows an air inlet duct (inlet flow duct) 11 forming a continuous, diffuser-type air passage from the engine intake 7 to the annular radial inlet on the compressor intake casing 13 (see FIG. 1).

Accordingly, the turboprop propulsion unit according to the present invention transmits the thrust and all engine loads through the pylon 1 to the fuselage 23 at the tail of the aircraft. Downstream of the nacelle 2, the propellers 5, 6 operate in free suspension arrangement, in correspondence with the pusher propeller tail installation.

It is understood that the present invention allows for variation of both the intakes/inlets 7, 8 and the nozzles 9 into an annulus or a multiple arrangement, for example. Here, it is important according to the present invention that the reversed installation of the turbomachine is provided in connection with the diversion of the airflow and the exhaust gas flow.

LIST OF REFERENCE NUMERALS

1 Pylon
2 Engine nacelle
3 Fairing of the front propeller hub
4 Fairing of the rear propeller hub
5 Front propeller/pusher propeller
6 Rear propeller/pusher propeller
7 Engine intake
8 Inlet to air-oil cooler
9 Nozzles with fairing of the reverser exhaust gas casing/turbine outlet area
10 Reverser exhaust gas casing/exhaust gas flow duct
11 Inlet duct/inlet flow duct
12 Propeller reduction gear
13 Compressor intake casing
14 Compressor
15 Combustion chamber
16 Turbine of gas-turbine engine
17 Power turbine
18 Linkage of engine suspension structure
19 Air-oil cooler (with air inlet 8)
20 Turbomachine accessory drive casing
21 Front propeller hub
22 Rear propeller hub
23 Fuselage

What is claimed is:

1. A turboprop propulsion unit comprising:
   a gas-turbine engine,
   at least one pusher propeller positioned aft of the gas-turbine engine and driven by the gas-turbine engine;
   wherein a main gas flow through the gas-turbine engine moves from aft forward, with respect to a direction of propulsion, such that a turbine outlet area of the gas-turbine engine is physically positioned forward of a compressor of the gas-turbine engine in the direction of flight; and at least one inlet flow duct for guiding airflow to the compressor, at least a portion of the at least one inlet flow duct positioned forward of the compressor.

2. The turboprop propulsion unit of claim 1, and further comprising:
   a reduction gear; and
   a turbine shaft connecting a turbine of the gas turbine engine with the pusher propeller via the reduction gear.

3. The turboprop propulsion unit of claim 2, wherein the at least one inlet flow duct guides airflow from an exterior of the gas-turbine engine toward the compressor and generally reverses a direction of such airflow before directing such airflow into an inflow area of the compressor.

4. The turboprop propulsion unit of claim 3, and further comprising at least one exhaust gas flow duct for guiding and generally reversing a direction of exhaust gas flow from the gas-turbine engine toward the thrust propeller.

5. The turboprop propulsion unit of claim 4, and further comprising at least one exhaust nozzle connected to the exhaust gas flow duct for rearwardly directing exhaust gas flow from the exhaust gas flow duct.

6. The turboprop propulsion unit of claim 5, wherein the inlet flow duct and the exhaust nozzle are arranged offset from one another in a circumferential direction of the turboprop propulsion unit.

7. The turboprop propulsion unit of claim 6, and further comprising a plurality of at least one of the inlet flow duct and the exhaust nozzle.

8. The turboprop propulsion unit of claim 7, comprising a plurality of counter-rotating pusher propellers.

9. The turboprop propulsion unit of claim 1, wherein the at least one inlet flow duct guides airflow from an exterior of the gas-turbine engine toward the compressor and generally reverses a direction of such airflow before directing such airflow into an inflow area of the compressor.

10. The turboprop propulsion unit of claim 9, and further comprising at least one exhaust gas flow duct for guiding and generally reversing a direction of exhaust gas flow from the gas-turbine engine toward the thrust propeller.

11. The turboprop propulsion unit of claim 10, and further comprising at least one exhaust nozzle connected to the exhaust gas flow duct for rearwardly directing exhaust gas flow from the exhaust gas flow duct.

12. The turboprop propulsion unit of claim 11, wherein the inlet flow duct and the exhaust nozzle are arranged offset from one another in a circumferential direction of the turboprop propulsion unit.

13. The turboprop propulsion unit of claim 12, and further comprising a plurality of at least one of the inlet flow duct and the exhaust nozzle.

14. The turboprop propulsion unit of claim 13, comprising a plurality of counter-rotating pusher propellers.

15. The turboprop propulsion unit of claim 1, and further comprising at least one exhaust gas flow duct for guiding and generally reversing a direction of exhaust gas flow from the gas-turbine engine toward the thrust propeller.

16. The turboprop propulsion unit of claim 15, and further comprising at least one exhaust nozzle connected to the exhaust gas flow duct for rearwardly directing exhaust gas flow from the exhaust gas flow duct.

17. The turboprop propulsion unit of claim 16, wherein the inlet flow duct and the exhaust nozzle are arranged offset from one another in a circumferential direction of the turboprop propulsion unit.

18. The turboprop propulsion unit of claim 17, and further comprising a plurality of at least one of the inlet flow duct and the exhaust nozzle.

19. The turboprop propulsion unit of claim 18, comprising a plurality of counter-rotating pusher propellers.

20. The turboprop propulsion unit of claim 1, comprising a plurality of counter-rotating pusher propellers.

* * * * *